United States Patent
Feng et al.

(10) Patent No.: US 9,183,993 B2
(45) Date of Patent: Nov. 10, 2015

(54) ONE-POT SYNTHESIS OF NB2O5-DOPED TIO2 NANOPARTICLES

(71) Applicant: Nano and Advanced Materials Institute Limited, Hong Kong (HK)

(72) Inventors: Shien-Ping Feng, Hong Kong (HK); Haijun Su, Hong Kong (HK); Ya-Huei Chang, Hong Kong (HK); Yu-Ting Huang, Hong Kong (HK); Nga Yu Hau, Hong Kong (HK); Peng Zhai, Hong Kong (HK)

(73) Assignee: NANO AND ADVANCED MATERIALS INSTITUTE LIMITED, Hong Kong (HK)

( * ) Notice: Subject to any disclaimer, the term of this patent is extended or adjusted under 35 U.S.C. 154(b) by 0 days.

(21) Appl. No.: 14/222,694

(22) Filed: Mar. 24, 2014

(65) Prior Publication Data
US 2015/0200057 A1    Jul. 16, 2015

Related U.S. Application Data

(60) Provisional application No. 61/925,663, filed on Jan. 10, 2014.

(51) Int. Cl.
*H01G 9/20* (2006.01)
*C01G 23/08* (2006.01)
(Continued)

(52) U.S. Cl.
CPC .............. *H01G 9/2031* (2013.01); *C01G 23/08* (2013.01); *C01G 33/00* (2013.01); *C09C 1/3653* (2013.01); *H01G 9/0029* (2013.01); *C01P 2002/54* (2013.01); *C01P 2002/60* (2013.01); *C01P 2002/72* (2013.01); *C01P 2002/82* (2013.01);
(Continued)

(58) Field of Classification Search
CPC ... C01G 33/006; H01G 9/2059; Y02E 10/542
USPC ............................ 423/610; 136/263; 252/500
See application file for complete search history.

(56) References Cited

PUBLICATIONS

Lu et al. "Improved-Performance Dye-Sensitized Solar Cells Using Nb-Doped TiO2 Electrodes: Efficient Electron Injection and Transfer", 2010, Advance Functional Materials 20, pp. 509-515.*

(Continued)

*Primary Examiner* — Jeffrey T Barton
*Assistant Examiner* — Daniel Malley, Jr.
(74) *Attorney, Agent, or Firm* — Ella Cheong Hong Kong; Sam T. Yip

(57) ABSTRACT

A one-pot synthesis of $Nb^{5+}$-doped $TiO_2$ nanoparticles (NPs) with low cost and high efficiency for dye sensitized solar cells (DSSCs) is disclosed in the present invention. The $Nb^{5+}$-doped $TiO_2$ NPs with Nb dopants of 0~5 mol % are prepared by directly mixing $TiO_2$ slurry with $Nb_2O_5$ gel obtained by UV treatment of a mixture of $NbCl_5$ powder, ethanol and water in a certain ratio, following by heat treatment without using hydrothermal method. The as-prepared NPs exhibit well-crystallized pure anatase $TiO_2$ phase with uniform particle distribution. The incorporation of $Nb^{5+}$ leads to a stronger and broader light absorption in visible light range and a decrease of band gap with increasing Nb dopant content, which enhances the efficiencies of light-harvesting and electron injection and suppresses the charge recombination. The present method provides a simple and cost-effective mass-production route to synthesize n-type metallic ion doped $TiO_2$ nanoparticles as excellent photoanode materials.

8 Claims, 13 Drawing Sheets

(51) Int. Cl.
C01G 33/00 (2006.01)
C09C 1/36 (2006.01)
H01G 9/00 (2006.01)

(52) U.S. Cl.
CPC ......... C01P 2002/84 (2013.01); C01P 2002/85 (2013.01); C01P 2004/03 (2013.01); C01P 2004/04 (2013.01); C01P 2004/82 (2013.01); H01G 9/2059 (2013.01)

(56) References Cited

PUBLICATIONS

Kim et al. "Enhanced Photovoltaic Properties of Nb2O5-Coated TiO2 3D Ordered Porous Electrodes in Dye-Sensitized Solar Cells", 2012, ACS Appl. Mater. Interfaces 4 (11), pp. 5821-5825.*
S. F. Zhang, X. D. Yang, Y. H. Numata, L. Y. Han, Energy Environ. Sci. 2013, 6, 1443-1464.
H. Jeong, Y. Pak, Y. Hwang, H. Song, K. H. Lee, H. C. Ko, G. Y. Jung, Small 2012, 8, 3757-3761.
B. O'Regan, M. Grätzel, Nature 1991, 353, 737-740.
F. Sauvage, J. D. Decoppet, M. Zhang, S.M. Zakeeruddin, P. Comte, M. Nazeeruddin, P. Wang, M. Grätzel, J. Am. Chem. Soc. 2011, 133, 9304-9310.
A. Yella, H. W. Lee, H. N. Tsao, C. Yi, A. K. Chandiran, M. K. Nazeeruddin, E. W . G. Diau, C. Y. Yeh, S. M. Zakeeruddin, M. Grätzel, Science 2011, 334, 629-634.
J. An, W. Guo, T. L. Ma, Small 2012, 22, 3427-3431.
L. Y. Han, A. Islam, H. Chen, C. Malapaka, B. Chiranjeevi, S. Zhang, X. Yang, M. Yanagida, Energy Environ. Sci. 2012, 5, 6057-6060.
H. C. Weerasinghe, F. Z. Huang, Y. B. Cheng, Nano Energy 2013, 2, 174-189.
H. J. Su, J. Zhang, L. Liu, H. Z. Fu, Trans. Nonferrous Met. Soc. China 2012, 22, 2548-2553.
J. He, H. Lindström, A. Hagfeldt, S. E. Lindquist, Sol. Energy Mater. Sol. Cells 2000, 62, 265-273.
H. N. Kim, J. K. Moon, ACS App. Mater. Interfaces 2012, 4, 5821-5825.
Q. P. Liu, Y. Zhou, Y. D. Duan, M. Wang, Y. Lin, Electrochim. Acta 2013, 95, 48-53.
Y. T. Shi, K. Wang, Y. D, H. Zhang, J. F. Gu, C. Zhu, L. Wang, W. Guo, A. Hagfeldt, N. Wang, T. L. Ma, Adv. Mater. 2013, 25, 4413-4419.
I. S. Cho, C. H. Lee, Y. Z. Feng, M. Logar, P. M. Rao, L. L. Cai, D. R. Kim, R. Sinclair, X. L. Zheng, Nature Communi. 2013, 4, 1723.
X. B. Chen, S. S. Mao, Chem. Rev. 2007, 107, 2891-2959.
X. Y. Wu, S. Yin, Q. Dong, C. S. Guo, T. Kimura, J. Matsushita, T. Sato, J. Phys. Chem. C 2013, 117, 8345-8352.
K. Y. Cai, Y. H. Hou, Y. Hu, L. Zhao, Z. Luo, Y. S. Shi, M. Lai, W.H. Yang, P. Liu, Small 2011, 21, 3026-3031.
W. Q. Luo, C. Y. Fu, R. F. Li, Y. S. Liu, H. M. Zhu, X. Y. Chen, Small 2011, 21, 3046-3056.
W. Zeng, T. M. Liu, Z. C. Wang, Sensors Actuat. B 2012, 166-167, 141-149.
L. D. Trizio, R. Buonsanti, A. M. Schimpf, A. Llordes, D. R. Gamelin, R. Simonutti, D.J. Milliron, Chem. Mater. 2013, 25, 3383-3390.
S. Singh, H. Kaur, V. N. Singh, K. Jain, T.D. Senguttuvan, Sensors Actuat. B 2012, 171-172, 899-906.
T. Nikolay, L. Larina, O. Shevaleevskiy, B.T. Ahn, Energy Environ. Sci. 2011, 4, 1480-1486.
J. Yu , Y. L. Yang, R. Q. Fan, H. J. Zhang, L. Li, L. G. Wei, Y. Shi, K. Pan, H. G. Fu, J. Power Sources 2013, 243, 436-443.
A. E. Shalan, M. M. Rashad, Appl. Surf. Sci. 2013, 283, 975-981.
Y. D. Duan, N. Q. Fu, Q. Zhang, Y. Y. Fang, X. W. Zhou, Y. Lin, Electrochim. Acta 2013, 107, 473-480.
X. J. Lü, X. L. Mou, J. J. Wu, D. W. Zhang, L. L. Zhang, F. Q. Huang, F. F. Xu, S. M. Huang, Adv. Funct. Mater. 2010, 20, 509-515.
S. G. Kim, M. J. Ju, I. T. Choi, W. S. Choi, H. J. Choi, J. B. Baek, H. K. Kim, RSC Adv. 2013, 3, 16380-16386.
H. P. Feng, T. C. Paudel , B. Yu, S. Chen, Z. F. Ren, G. Chen, Adv. Mater. 2011, 23, 2454-2459.
Y. S. Chen, I. E. Wachs, J. Catal. 2003, 217, 468-477.
X. L. Wang, W. X. Hu, I. M. Chou, J. Geochem. Explor. 2013, 132, 111-119.
J. H. Jang, T. Y. Kim, N. J. Kim, C. H. Lee, E. M. Park, C. Park, S. J. Suh, Mater. Sci. Eng. B, 2011, 176, 1505-1508.
M. Z. Atashbar, H. T. Sunb, B. Gong, W. Wlodarski, R. Lamb, Thin Solid Films 1998 326, 238-244.
T. L. Thompson, J. T. Yates, Chem. Rev. 2006, 106, 4428-4453.
S. S. Shin, J. S. Kim, J. K. Suk, K. D. Lee, D. W. Kim, J. H. Park, I. S. Cho, K. S. Hong, J. Y. Kim, ACS Nano 2013, 7, 1027-1035.
J. Yang, X. T. Zhang, C. H. Wang, P. P. Sun, L. L. Wang, B. Xia, Y. C. Liu, Solid State Sci. 2012, 14, 139-144.
G. Cheng, M. S. Akhtar, O. B. Yang, F. J. Stadler, ACS Appl. Mater. Interfaces, 2013, 5, 6635-6642.
Y. T. Shi, C. Zhu, L. Wang, C. Y. Zhao, W. Li, K. K. Fung, T. L. Ma, A. Hagfeldt, N. Wang, Chem. Mater. 2013, 25, 1000-1012.
M. Adachi, M. Sakamoto, J. Jiu, Y. Ogata, S. Isoda, J. Phys. Chem. B 2006, 110, 13872-13880.
H.K. Fujishima Akira, Nature 1972, 238.
H. Kato, M. Hori, R. Konta, Y. Shimodaira, A. Kudo, Chemistry Letters 2004, 33, 1348-1349.
A. Kudo, Y. Miseki, Chemical Society Review 2009, 38, 253-278.
Chandiran et al., "Doping a TiO2 Photoanode with Nb5+ to Enhance Transparency and Charge Collection Efficiency in Dye-Sensitized Solar Cells", J. Phys. Chem. C, 2010, 114, 15849-15856.
European Patent Office Communication of Jul. 20, 2015 for EP Application No. 14161905.6.

* cited by examiner

ONE-POT SYNTHESIS OF NB2O5-DOPED TIO2 NANOPARTICLES

CROSS-REFERENCE TO RELATED APPLICATION

This application claims benefits from the U.S. provisional patent application No. 61/925,663 filed Jan. 10, 2014, and the disclosure of which is incorporated herein by reference in its entirety.

FIELD OF THE INVENTION

The present invention relates to a method for one-pot synthesis of $Nb_2O_5$-doped $TiO_2$ nanoparticles. The present invention also relates to the use of the $Nb_2O_5$-doped $TiO_2$ nanoparticles for fabricating dye sensitized solar cells.

BACKGROUND OF THE INVENTION

With the great increase of global energy consumption, the development of highly efficient and low-cost renewable energy resources becomes extremely important and necessary, in which the most feasible technology is to directly convert solar energy into electronic power by solar cells.[1,2] As an attractive alternative to conventional silicon-based solar cells for low-cost clean energy, dye sensitized solar cells (DSSCs) have received considerable interests due to its low production cost, simple fabrication processes, environmental friendliness, and relatively high photoelectric conversion efficiency.[3-6] For DSSCs, achieving high energy conversion efficiency is one of the most important keys to the future commercialization in the huge electricity generation market.[1,7] In the past few decades, the development of DSSCs can be regarded as a process of continuously improving efficiency since nano-crystalline DSSCs were reported by Grätzel et al. in 1991.[1-8] The energy conversion efficiencies over 12% has been achieved for DSSCs in the lab size devices,[5] however, it is still far lower than the current multicrystalline silicon solar cells (~20%),[9] and there is a large space for the improvement of DSSCs performance.[10] Therefore, developing new materials and structure with low-cost fabrication technique for DSSCs, and understanding the intrinsical mechanisms of photo-electron conversion are highly desired.

In general, a typical DSSC comprises a dye-sensitized $TiO_2$ nanocrystalline porous film coating on a transparent conductive oxide (TCO) glass substrate as the photoanode, a liquid redox electrolyte containing an $I^-/I^{3-}$ redox couple, and a platinum (Pt) catalyst as the counter electrode (CE).[3] The photoanode containing porous $TiO_2$ nanoparticles (NPs), one of the most important components in DSSCs, is responsible for adsorbing dye molecules, transferring the photogenerated electrons from the dye to $TiO_2$ and to the conductive substrate, and providing a diffusion path for redox ions, which importantly influences the charge recombination, electron collection and transportation rate, and the light absorption.[11,12] Therefore, the characteristics of the porous $TiO_2$ NPs, especially the morphology and size, interparticle connectivity, pore structure, and electric structure, are greatly vital in determining the final photovoltaic performance of DSSCs.[13] It has been demonstrated that the wide band gap of $TiO_2$ (3.2 eV) and high recombination rate of photogenerated hole-electron pairs are main limitation factors for its performance improvement and widespread application in industry.[14] In order to address these problems, several strategies, such as dye sensitizing, heterostructure, ion doping, etc., have been developed.[14-17] Among them, the ion doping is believed to be the most economical and facile method to optimize the performance of $TiO_2$ NPs by simply modifying its structure (morphology, size, electronic structure), which has been widely used in the photocatalysis, biological engineering and gas sensors fields,[18-21] but there are relatively few studies applied in DSSCs.[15,22] More recently, in order to further improve the efficiency of DSSCs, several efforts has been tried to modify nanostructured $TiO_2$ NPs by metal ions doping such as $Er^{3+}$, $Yb^{3+}$, $Mg^{2+}$, $Zn^{2+}$, $Mn^{2+}$, $Co^{2+}$, $Sn^{4+}$, and $Nb^{5+}$, aiming to enhance electron transportation and suppress charge recombination.[12,22-26] Of these doping elements, the Nb stands out to show great potential in improving DSSCs performance due to the synergistic advantages of superior electrical conductivity, similar atom radii with Ti, high valence favorably enhancing free carriers, and excellent ability in stabilizing the phase structure and tailoring the optical properties. For example, Lü et al.[26] and Nikolay et al.[22] have synthesized Nb-doped $TiO_2$ particles by a hydrothermal method and used them in high efficiency DSSCs. However, an important limitation for the practical application of the Nb-doped $TiO_2$ NPs applied in DSSCs is that the starting materials either use expensive niobium ethoxide or the preparation method adopts the hydrothermal technique which includes multi steps and long time,[22,26,27] thereby leading to high preparation cost and low production efficiency. For example, Nb-doped TiO2 was prepared by a sol-gel method followed by a hydrothermal treatment in Lü et al; the original sources of TiO2 and Nb in Nikolay et al. were from niobium powder and tetrabutyl titanate, which were added into hydrogen peroxide and ammonia (5:1 v/v) to obtain the precursor and followed a series of procedure. Both of these conventional methods are more complicated and in higher cost to synthesize the TiO2 and precursor.

Therefore, a facile one-pot synthesis as an economical, simple, and high yield approach for preparing $Nb^{5+}$-doped $TiO_2$ nanoparticles for use in highly efficient DSSCs with a high energy conversion efficiency is highly demanded.

SUMMARY OF THE INVENTION

To address the demand, the first aspect of the present invention relates to a method for making $Nb^{5+}$-doped $TiO_2$ nanoparticles (NPs) with low cost and high yield efficiency for use in DSSCs. The $Nb^{5+}$-doped $TiO_2$ NPs with 0~5 mol % of Nb dopants are prepared by first directly mixing a $TiO_2$ slurry with a functionalized $Nb_2O_5$ gel following by heat treatment without using hydrothermal method. The functional $Nb_2O_5$ gel is obtained by UV treatment of a mixture of $NbCl_5$ powder, ethanol and water with a certain ratio (0.027% w/v of $NbCl_5$ powder; volume ratio of ethanol to water is 1:1). The as-prepared NPs exhibit well-crystallized pure anatase $TiO_2$ phase with uniform particle distribution and average size of about 15~18 nm. The Raman and XPS results demonstrate that the Nb is well doped into the $TiO_2$ lattice and the substitution of $Nb^{5+}$ on $Ti^{4+}$ is formed using the presently claimed method. The incorporation of $Nb^{5+}$ leads to a stronger and broader light absorption in visible light range (red shift) and a decrease of band gap with increasing Nb dopant content, which importantly enhances the efficiencies of light-harvesting and electron injection, and effectively suppresses the charge recombination. In one of the embodiments of the present invention, the best energy conversion efficiency of 8.44% is resulted from 2.0 mol % Nb-doped $TiO_2$, which presents a significant improvement of 18.9% compared with the undoped (0 mol % Nb) $TiO_2$ cell. The presently claimed method provides a simple and cost-effective mass-production route to synthesis n-type metallic ion doped $TiO_2$ nanoparticles as excellent photoanode materials.

The second aspect of the present invention relates to the use of the $Nb^{5+}$-doped $TiO_2$ nanoparticles (NPs) prepared by the presently claimed method for fabricating DSSCs. It involves the fabrication of a photoanode which is coated with a film of undoped TiO2 slurries followed by a film of the $Nb^{5+}$-doped $TiO_2$ nanoparticles thereon. The coated photoanode after sintering is then sandwiched with a counter electrode, an electrolyte and a spacer to form an assembly. The assembly is then hot sealed by covering a thin glass in the presence of a hot-meal film underneath in order to form the DSSCs.

BRIEF DESCRIPTION OF THE DRAWINGS

The accompanying drawings illustrate embodiments of the present invention and, together with the description, serve to explain the principles of the invention.

DESCRIPTION OF THE INVENTION

The following examples are used to assist the illustration and understanding of the presently claimed invention, but are not intended to limit the scope of the presently claimed invention.

EXAMPLE 1

One-Pot Preparation Of Nb-Doped $Tio_2$ Nanoparticles

Figure 11:
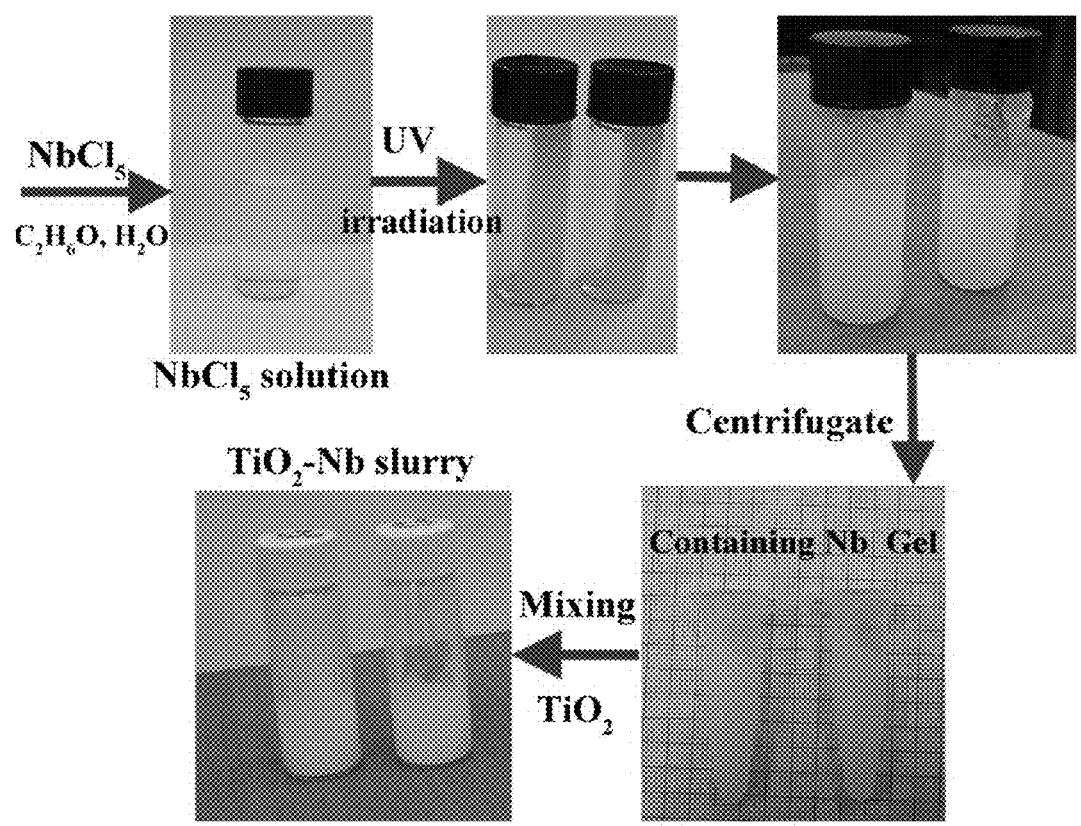
FIG. 11 is a schematic diagram with photos showing the preparation procedures of the $TiO_2$—Nb composite slurry.

All chemical materials are purchased commercially, and used without further purification. Because the preparation process of $TiO_2$ NPs have been mature at present, the commercial $TiO_2$ slurry (Eternal Chemical Co. Ltd.) containing uniform NPs (concentration 18.6%) can be directly used as the starting base materials to provide the Ti source in the present invention, aiming to simplify the doping preparation process and improve the preparation efficiency. Niobium chloride ($NbCl_5$) is used as the starting material to provide the Nb dopant source. The one-pot synthesis of $Nb^{5+}$-doped $TiO_2$ NPs is described as follows: 0.08 g $NbCl_5$ (99%, Aldrich) powder is dissolved in 1.5 mL ethanol and then 1.5 mL deionized $H_2O$ is added and stirred to obtain a transparent precursor solution. After that, the transparent precursor solution is sequentially treated by the processes of UV irradiation for 20 min, high speed centrifugation (4000 rpm, 10 min), and removing the residual $H_2O$ to obtain a polymeric gel containing Nb. Then, the polymeric gel is prepared in different weights corresponding to the molar ratios of Nb/(Nb+$TiO_2$) varying from 0.5~5.0 mol % by respectively adding 2 g commercially available $TiO_2$ slurry into the polymeric gel containing corresponding amount of niobium compound (please refer Table 1), followed by a high-speed mixing (2200 rpm, 2 min) and defoaming (2000 rpm, 2 min) using a conditioner mixer (Are-250, Thinky) to obtain several homogenously mixed $TiO_2$—Nb composite slurries with different molar ratios of Nb/(Nb+$TiO_2$). It is possible to scale up the amount of commercially available $TiO_2$ slurry to a maximum of about 5,000 g depending on the capacity of the mixer. The whole preparation procedure is shown in FIG. 11. The $Nb^{5+}$-doped $TiO_2$ NPs with different dopant contents (0~5 mol %) are finally obtained by a heat treatment of each of the respective homogenously mixed $TiO_2$—Nb composite slurries at 500° C. for 30 min.

TABLE 1

| | STD | Nb 0.5 mol % | Nb 1 mol % | Nb 2 mol % | Nb 5 mol % |
|---|---|---|---|---|---|
| Ratio: $H_2O:C_2H_5OH$ | NA | 1:1 | 1:1 | 1:1 | 1:1 |

TABLE 1-continued

|  | STD | Nb 0.5 mol % | Nb 1 mol % | Nb 2 mol % | Nb 5 mol % |
|---|---|---|---|---|---|
| Total volume of solvent | NA | 3 ml | 3 ml | 3 ml | 3 ml |
| Original Weight of $NbCl_5$ | NA | 0.08 g | 0.08 g | 0.08 g | 0.08 g |
| UV irradiation time | NA | 20 min | 20 min | 20 min | 20 min |
| Residual Weight of Sol-gel after centrifugation | NA | 1.184 g | 1.184 g | 1.184 g | 1.144 |
| Weight of Added Nb Sol-gel into 2 g $TiO_2$ slurry | 0 | 92.21 mg | 184.82 mg | 373.97 mg | 964.28 mg |

EXAMPLE 2

Fabrication of DSSCs

The fluorine-doped $SnO_2$ conducting glasses (FTO, 10Ω/□, 3.1 mm thick, Nippon Sheet Glass) are ultrasonically cleaned in 4% glass cleaner (PK-LCG545, Parker) at 50° C. for 30 min, followed by rinsing with deionized water. To fabricate the photoanode, a two-film electrode is used. A first film which is a three-layer film of commercially available undoped $TiO_2$ slurry is firstly coated onto the cleaned FTO glass by screen printing technique and then further coated by a second film which is a bi-layer film of the $TiO_2$—Nb composite slurry prepared according to Example 1. The thickness of the obtained $TiO_2$ bi-layer film is about 10 µm. The bi-layer film of the $TiO_2$—Nb composite slurry coated on the three-layer film of commercially available undoped $TiO_2$ slurry is then sintered at 450° C. for 30 min to remove the organics and then slowly cooled to room temperature to form a sintered photoanode. Subsequently, the sintered photoanode is immersed in a 0.4 mM N719 dye solution (Solaronix) at room temperature for 12 h to make the porous Nb-doped $TiO_2$ nanoparticles sufficiently absorb dye molecules, followed by rinsing with ethanol and drying in air. The tin-doped indium oxide glass (ITO, 7Ω/□, 1.1 mm thick, Gem Tech.) coated by platinum nanoparticles (Pt NPs) catalyst by a dip-coating process is used as the counter electrode (CE).[28] The DSSCs are assembled by sandwiching a dye-covered $TiO_2$ photoanode and a Pt NPs-coated CE with an electrolyte (0.2M 1-propyl-3-methylimidazolium iodide or called PMII, 0.05 M $I_2$, 0.1M LiI, 0.2M tetrabutylammonium iodide or called TBAI, 0.5M 4-tert-butylpyridine or called TBP in acetonitrile:valeronitrile (75:25) solvent (AN:VN)) in the presence of a 25-µm thick thermal-plastic Surlyn® spacer (SX1170-25, Solaronix). The active area of the cells is about 0.16 $cm^2$. Finally, the DSSCs are hot sealed using a piece of thin cover glass with a hot-melt film underneath as an adhesive.

EXAMPLE 3

Characterization Methods

The chemical structure of the gel is analyzed by Raman spectroscopy (inVia Reflex, Renishaw) with a laser wavelength of 514 nm. The crystal structure and phase identification of the prepared $TiO_2$ NPs are performed by X-ray diffractometer (XRD, D8 Advance, Bruker). The morphology, size, crystallinity, and lattice structure of the NPs are investigated by field-emission transmission electron microscope (FE-TEM, Tecnai G2 F20 S-TWIN, FEI) as well as high resolution TEM (HRTEM). The binding state of chemical bond is studied by Raman spectra. The electronic structure and binding energy are determined by means of X-ray photoelectron spectroscopy (XPS, PHI-5400, PE). The surface morphology and microstructure of the $TiO_2$ films are observed by scanning electron microscope (SEM, S-4800, Hitachi). The optical transmittance spectra of the films are performed by UV-vis spectrophotometer (HP 8453). The incident photon-to-current conversion efficiency (IPCE) spectra of DSSCs are obtained by IPCE Kit equipment in wavelength range of 400-800 nm. The photocurrent-voltage (J-V) curves of DSSCs are recorded with a computer-controlled digital source meter (Keithley 2400) under exposure of a standard solar simulator (PEC-L01, Pecell) under 1 sun illumination (AM 1.5 G, 100 mWcm$^{-2}$). The electrochemical impedance spectroscopy (EIS) is measured on DSSCs under 1.5 AM illumination by a computer-controlled electrochemical workstation (Reference 3000, Gamry) in the frequency range of 0.1-$10^6$ Hz and AC amplitude of 10 mV at open-circuit conditions.

EXAMPLE 4

Structural Characterization of Nb-Doped $TiO_2$ NPs

Figure 1:
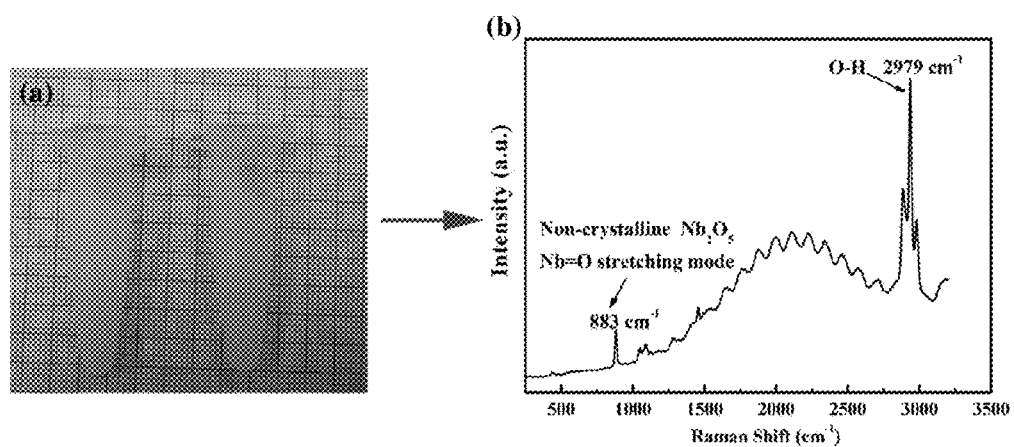
FIG. 1 is a photograph of the sol-gel containing Nb after UV and centrifugation treatment (a) and the Raman spectra of the as-prepared sol-gel sample (b).

During the one-pot preparation of Nb-doped $TiO_2$ NPs, the homogenous mixing of the Nb gel with the commercially available $TiO_2$ slurry are very important, in which the gel with suitable viscosity is the key. Homogenous, transparent and stable sols are preferred to obtain at the volume ratio of 1:1 for ethanol/$H_2O$, as shown in FIG. 11. The UV treatment can accelerate the hydrolysis and condensation of the sol to form a polymeric gel, as shown in FIG. 1a. The Raman analysis of the dehydrated gel is shown in FIG. 1b. Two obvious peaks can be found. One is emerged at 883 cm$^{-1}$, which is commonly corresponding to the stretching mode of terminal Nb=O bonds typical appeared in amorphous $Nb_2O_5$.[20,29] The other is at 2979 cm$^{-1}$, which is usually assigned to the stretching O—H bond.[30] It indicates that the dehydrated gel is mainly composed of amorphous $Nb_2O_5$ and O—H functional group, which favors its mixing with $TiO_2$ slurry to form new dehydrated metal oxide molecular structures.[29] The viscosity of $TiO_2$—Nb composite slurry is decreased with increasing Nb dopant content by increasing Nb gel weight, which influences the film printing quality.

Figure 2:
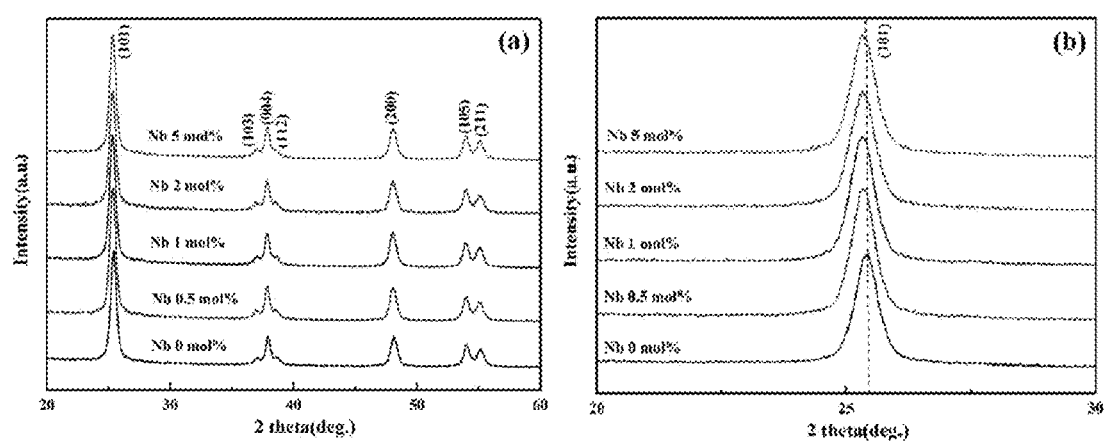
FIG. 2 shows the XRD patterns of undoped and Nb-doped $TiO_2$ nanoparticles (a) and details of the XRD patterns around 24° to 27° 2θ values (b).
Figure 3:
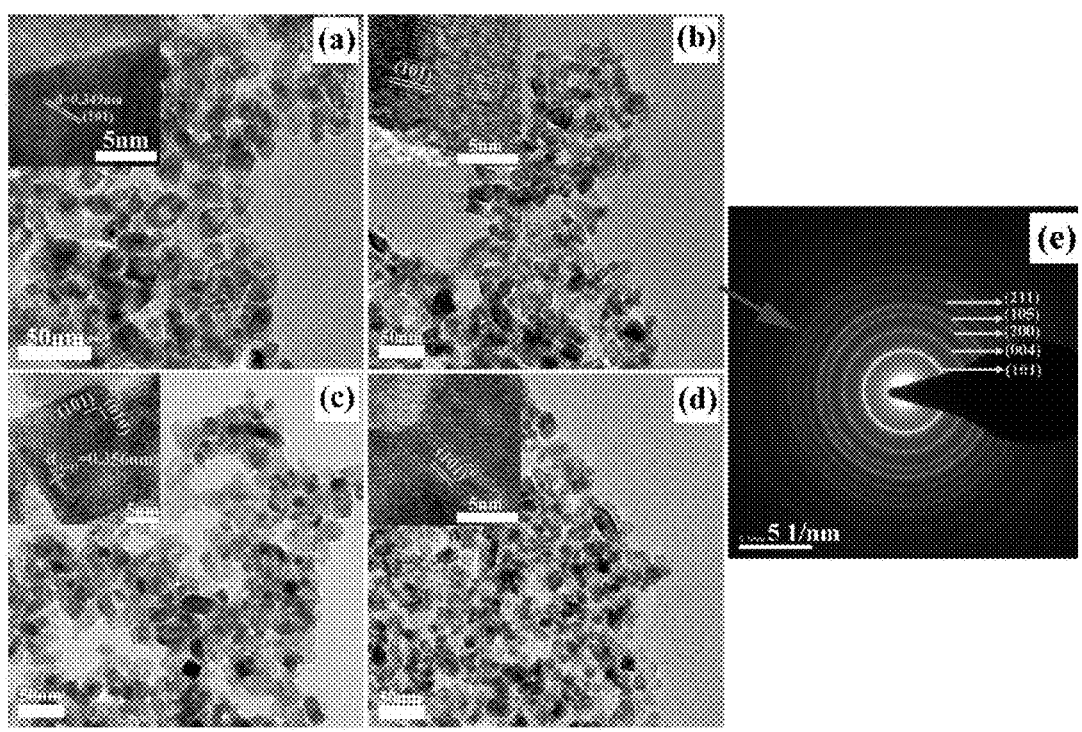
FIG. 3 shows the TEM images of the Nb-doped $TiO_2$ nanoparticles with different Nb contents: (a) 0 mol %; (b) 0.5 mol %; (c) 1 mol %; (d) 5 mol %. (e) is the electrondiffraction pattern of 0.5 mol % Nb-doped $TiO_2$ nanoparticles. The insets in the images are the corresponding HTREM morphologies for each sample.

FIG. 2 shows the XRD patterns of the undoped and Nb-doped $TiO_2$ NPs with different Nb contents. It can be seen that samples consist of only anatase phase with body-centered tetragonal crystal structure, which is similar to the result of Lü et al.[26] but different from that of Nikolay et al.[22] whose result shows that there is also TiO$_2$ rutile phase found in the Nb-doped TiO$_2$ NPs and Nb can suppress the formation of rutile phase. No any other peaks such as Nb, Nb$_2$O$_5$, NbCl$_5$ or rutile phase are detected, revealing that the anatase TiO$_2$ nanostructure is well retained after doping and Nb has been successfully incorporated into the TiO$_2$ lattice. Moreover, it is found that the (101) diffraction peaks of anatase phase gradually shift to lower diffraction angle with increasing Nb dopant content (FIG. 2b), which may be caused by the substitution of Ti$^{4+}$ with Nb$^{5+}$ because the Nb$^{5+}$ radius (0.64 Å) is larger than Ti$^{4+}$ radius (0.61 Å). According to the Debye-Scherrer equation (2d sin θ=λ, d, crystal plane spacing, λ, wavelength), the crystallite size of 0.5 mol % Nb-doped TiO$_2$ NPs is calculated to be about 16.7 nm. Furthermore, the slightly increased full width at half maximum (FWHM) for (101) peaks from 0.5-5 mol % Nb suggests that the crystallite size decreases with increasing Nb content, which are well consistent with the TEM images shown in FIG. 3 and Table 2. As clearly seen, all Nb-doped TiO$_2$ NPs show high crystallinity and uniform crystallize size distribution with tetragonal shapes, rather than the mixed nanocrystals with rhombic and rod-like shapes reported previously by Nikolay et al.[22] The mean size exhibits a slightly decrease from 17.7 nm to 14.7 nm but the shape does not change with the increase of Nb dopant content. It is different from the report of Trizio et al.,[20] in which the shape of TiO$_2$ NPs changes from tetragonal platelets to peanutlike rods. The decrease of the crystallite size indicates the introduction of Nb can effectively inhibit the growth of anatase TiO$_2$ NPs, which is favorable to electron transport and collection.[13] As compared with the (101) lattice planes in the HRTEM images for the undoped TiO$_2$ and 1 mol % Nb-doped TiO$_2$ NPs, the tiny increase in d-spacing directly correlated with the lattice distortion further verifies that the Nb$^{5+}$ is homogeneously filled into the cation sites that are usually occupied by Ti$^{4+}$.

TABLE 2

| Particles | Nb 0 mol % | Nb 0.5 mol % | Nb 1.0 mol % | Nb 2.0 mol % | Nb 5.0 mol % |
|---|---|---|---|---|---|
| Mean size (longest dimension) | 17.7 nm | 16.5 nm | 15.4 nm | 15.1 | 14.7 nm |

Figure 4:
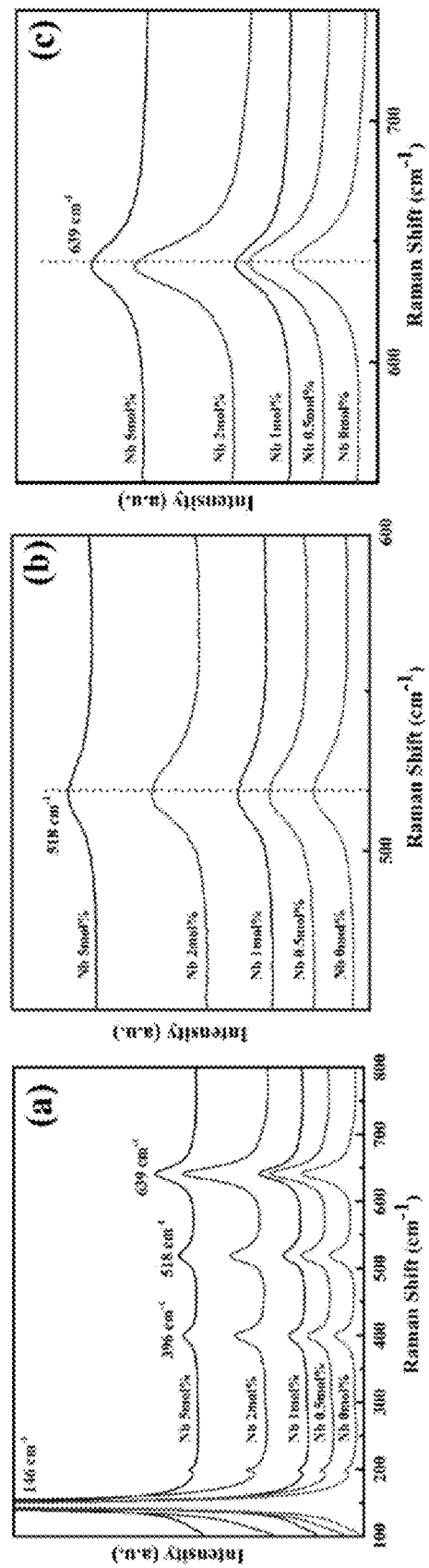
FIG. 4 shows the Raman spectra of the Nb-doped $TiO_2$ nanoparticles with different Nb contents (a) and the magnified spectra in the range of 450~600 $cm^{-1}$ (b) and the range of 550~750 $cm^{-1}$ (c).

FIG. 4 shows the Raman spectra of the undoped and Nb-doped TiO$_2$ NPs with different Nb contents. Being different from the Raman spectra (FIG. 1b) of the gel continuing amorphous Nb$_2$O$_5$, all TiO$_2$ NPs present single anatase phase active modes without any other impurity phase, in well agreement with the XRD results (FIG. 2). The disappearance of the amorphous Nb$_2$O$_5$ means that the incorporated Nb atoms have been fully doped into the TiO$_2$ lattice because the Nb$_2$O$_5$ generally has higher crystallization temperature than TiO$_2$.[31] The study of Trizio et al.[20] shows that the amorphous Nb$_2$O$_5$ will possibly appear when excess Nb dopant is added (>10%). Four main characteristic peaks of TiO$_2$ are centered at 146, 396, 518, 639 cm$^{-1}$, which are responding to Eg (v6), B1g, A1g and Eg (v1) vibrational modes, respectively. The Raman peaks at 146 cm$^{-1}$ usually assigned to Ti—O bond are observed to broaden with increasing the Nb content, which implies the formation of Nb—O—Ti bond.[20,29] The intensity of Raman peaks for the Nb-doped TiO$_2$ NPs shows an increase in comparison with the undoped TiO$_2$, suggesting an improved crystallinity degree caused by the decreased crystallization temperature due to Nb doping. Additionally, the peaks at 518 cm$^{-1}$ and 639 cm$^{-1}$ exhibit a slight shift to smaller wavenumber (FIGS. 4b and c), which may result in a decreased band gap energy and improved photocatalysis property.[14]

Figure 5:
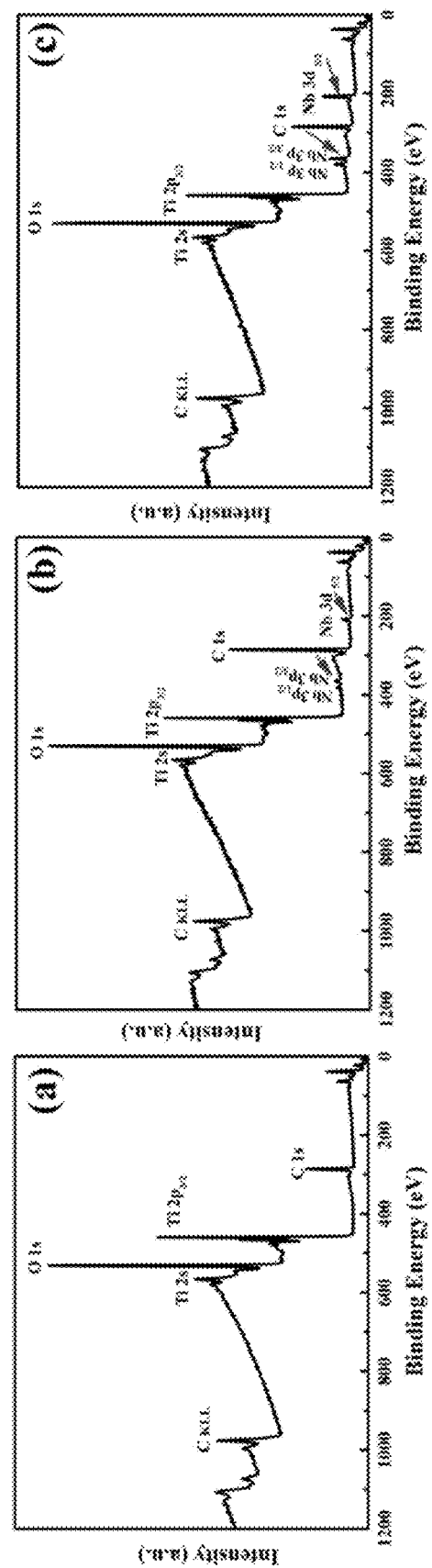
FIG. 5 shows the XPS survey spectra of Nb-doped $TiO_2$ nanoparticles with different Nb contents: (a) 0 mol %; (b) 2 mol %; (c) 5 mol %.
Figure 6:
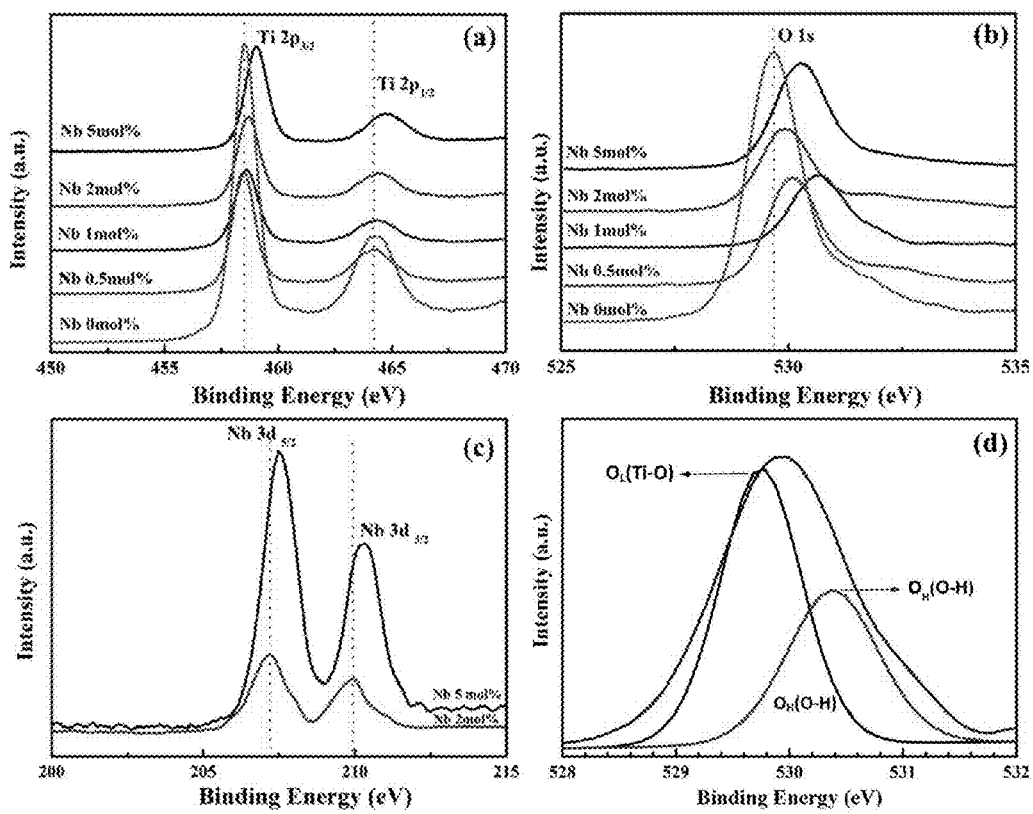
FIG. 6 shows the Ti 2p (a), O 1s (b) and Nb 3d (c) high resolution XPS spectra of Nb-doped $TiO_2$ nanoparticles with different Nb contents; (d) is the fitting result of the 2 mol % Nb-doped $TiO_2$ sample for the O 1s spectra.

The chemical state and electronic structure of the Nb-doped NPs are investigated by XPS measurement which is sensitive to the tiny differences in metal oxidation states, as shown in FIGS. 5 and 6. FIG. 5 shows the typical XPS survey spectra of pure TiO$_2$, 2 mol % Nb and 5 mol % Nb-doped TiO$_2$ NPs. The peaks for Ti, O, and Nb are clearly observed in the Nb-doped NPs, and the peak intensity of Nb increases with the increase of Nb dopant, confirming the presence of niobium element. The C peaks observed are probably due to incomplete decomposition of the carbon in the starting material and air absorbents. The atomic concentration of Nb obtained from the XPS data of 2 mol % Nb-doped TiO$_2$ NPs suggests that the molar ratio of Nb to TiO$_2$ is 1.9%, which is close to the theoretical value. FIG. 6 shows the high resolution XPS spectra of Ti 2p (a), O 1s (b and d) and Nb 3d (c) for pure and doped NPs. In FIG. 6a, the binding energies (BE) of Ti 2p$_{3/2}$ and Ti 2p$_{1/2}$, typically corresponding to Ti$^{4+}$ oxidation state,[32] appear approximately at 458.6 eV and 464.4 eV, respectively, showing a separation of 5.8 eV. No Ti$^{3+}$/Ti$^{2+}$ peaks are observed, which indicates that only stoichiometric TiO$_2$ is formed. Moreover, a little shift of the Ti 2p spectra to higher BE value is observed after Nb doping as compared to pure TiO$_2$, which is likely attributed to the aliovalent substitution effect of Ti atoms by Nb atoms. The O 1s spectra (FIG. 6b) at about 529.7 eV comes from Ti$^{4+}$—O bonds, displaying a similar shift toward a higher energy levels with increasing the Nb dopants due to the increasing contribution by the lattice oxygen in TiO$_2$.[33] It shows a two-band structure (FIG. 6d), namely, the main peak for the O1s electron binding energy for TiO$_2$ (O$_L$) and the other peak at 530.5 eV which may be attributed to the adsorbed OH groups (Ti—OH) come from the gel.[34] The XPS spectra for the Nb region (FIG. 6c) exhibit the Nb 3d$_{3/2}$ peak at 209.9 eV and Nb 3d$_{5/2}$ at 207.3 eV, respectively, with a spin-orbit splitting of 2.4 eV. The area/intensity of the Nb 3d peaks increases with the increase of Nb contents. Usually, the BE of Nb$^{2+}$ and Nb$^{4+}$ appears at 204 and 205 eV,[11] respectively. Therefore, it confirms that the Nb element in the doped TiO$_2$ NPs only exists in Nb$^{5+}$ to form the Nb—O—Ti bonds and it has been doped into TiO$_2$ lattice, which would lead to an increase of the BE since the electronegativity of Nb (1.6) is larger than that of Ti (1.54) and to extra electrons for charge compensation.[20] The XRD, Raman and XPS data all point to the conclusion that only metal ions of Nb$^{5+}$ and Ti$^{4+}$ produced in the Nb-doped NPs by using this cost-effective method.

Figure 12:
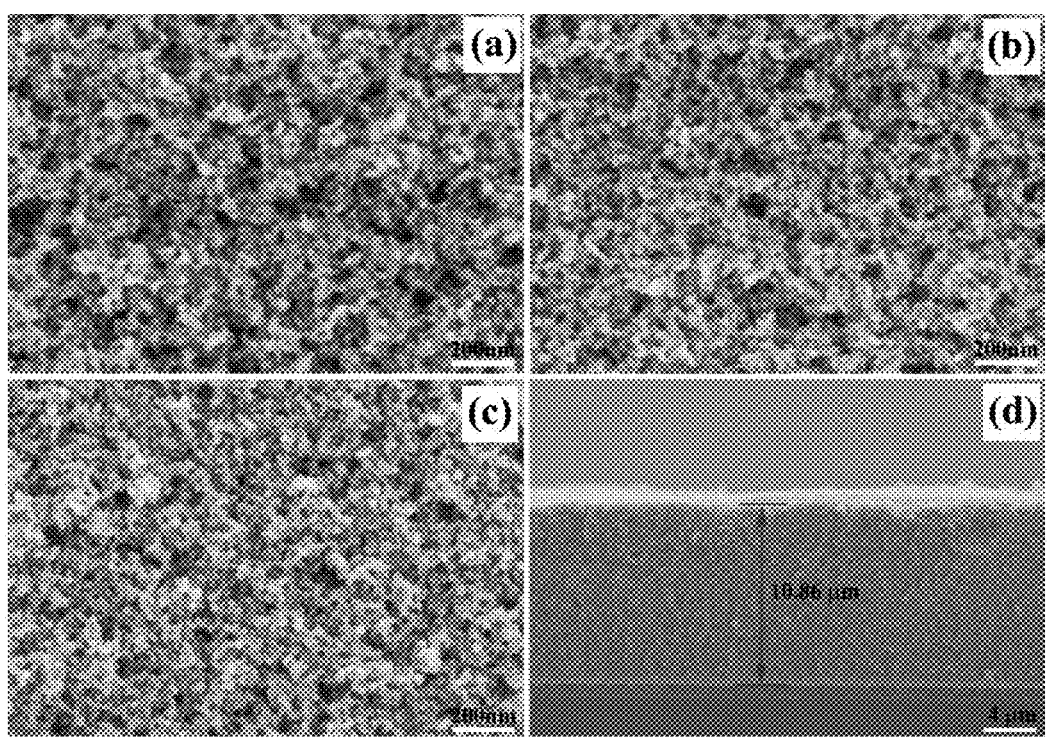
FIG. 12 shows the SEM microstructure morphologies of the Nb-doped nanostructured $TiO_2$ films with different Nb contents: (a) 0 mol %; (b) 0.5 mol %; (c) 1 mol %. (d) is the cross-section microstructure of the 0.5 mol % Nb-doped $TiO_2$ film on the conductive FTO glass.

The microstructure morphologies of the Nb-doped TiO$_2$ films show a uniform distribution of NPs in size and shape, as illustrated by FIGS. 12b and c. The film thickness is about 10 μm with dense structure (FIG. 12d). No particle agglomerations are found, indicating that a homogenous mixing and doping of Nb with the pure TiO$_2$. Moreover, as compared to the undoped films (FIG. 12a), the density of Nb doped TiO$_2$ films (FIGS. 12b and c) is obviously improved with increasing the Nb dopants, suggesting the Nb doping effectively enhances the crystallite of TiO$_2$ NPs.

EXAMPLE 5

Optical Properties of Nb-Doped Tio$_2$ NPs

FIG. 7a shows the transmission spectra of the pure TiO$_2$ and Nb$^{5+}$-doped TiO$_2$ NPs films measured by UV-vis in the wavelength range of 300-800 nm. The corresponding absorbance spectra are shown in FIG. 7b. As seen, all films exhibit 10-35% transmission in visible region and a strong absorption below 400 nm. With increasing the Nb dopants, the absorbance intensity of visible light increases and the absorption edge displays a shift toward the longer wavelength (visible light region), as shown in FIGS. 7b and c. The light absorption covers the UV and whole visible range of 200-900 nm. The red shift phenomena can be attributed to the charge transfer from $O^{2-}$ 2p level to $Nb^{5+}$ 4 $d^0$ level instead of $Ti^{4+}$ $3d^0$ due to Nb doping.[16] When Nb is doped, some unoccupied $Nb^{5+}$ 4d energy level below the conduction band (CB) of $TiO_2$ would be formed, which will transfer the electron from the valence band (VB) of $TiO_2$ to this doped Nb energy level to achieve the visible absorption. It also indicates the Nb doping decreases the band gap of $TiO_2$, consequently, leading to a modification of the light absorption characteristic and the expansion of the absorption range of visible light. Based on the UV-vis spectra, the optical band gap ($E_g$) is calculated according to the following equation:

$$\alpha h\nu = A(h\nu - E_g)^n \quad (1)$$

where α is the optical absorption coefficient, hv is photo energy, Eg is the absorption band gap, A and n are constants. For the indirect semiconductor of anatase $TiO_2$, n is equal to ½. The $(\alpha h\nu)^{1/2}$ versus hv plots are shown in FIG. 7d. The tangent intercept represents the bang gap, showing an obvious red shift. The variant of the Eg with increasing the Nb dopant is given in the inset of FIG. 7d, which exhibits an overall narrow after Nb doping. Similar tendency is also reported by Lü et al.[26] and Kim et al.[27] The smaller band gap means the CB of $TiO_2$ downshifts with increasing Nb dopant through the mixing of Nb 4d and Ti 3d states,[35] which favors the enhancements of the electron-injection efficiency and short-current when it is applied in DSSCs.

Figure 13:
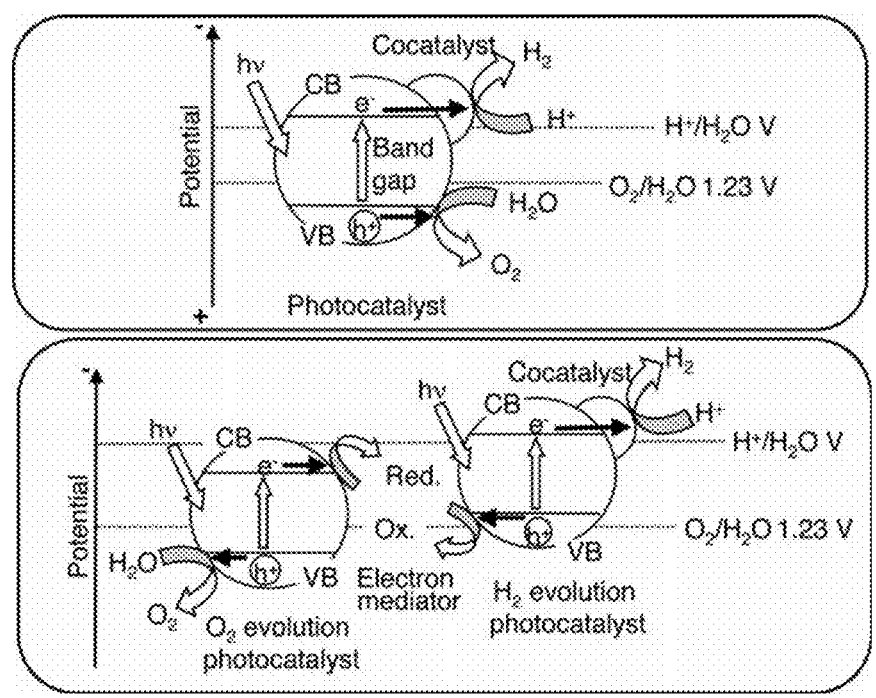
FIG. 13 is a schematic diagram of the two photocatalyst systems for water splitting.

The Honda-Fujishima effect[39] found that when a $TiO_2$ electrode was irradiated with UV light, the electrons and holes were generated and caused water splitting directly on semiconductor/liquid contact. The heterogeneous reaction occurs at the surface needs to supply sufficient potentials for water splitting[40]. The essential points are the difference in the band gap and the levels of the conduction band (CB) and valance band (VB) level. Due to the redox potential of $H^+/H_2$ (0 V vs. NHE), the CB level has to be more negative than that. On the other hand, the top of VB level needs to be more positive than the redox potential of $O_2/H_2O$ (1.23 V) as shown in FIG. 13. The Nb-doping leads to a smaller band gap of $TiO_2$, which implies that there is a potential for a more effective utilization in photocatalyst for water splitting under UV light irradiation. For further application, it could be photocatalyst for $O_2$ evolution and $H_2$ evolution with suitable mediator.

Figure 7:
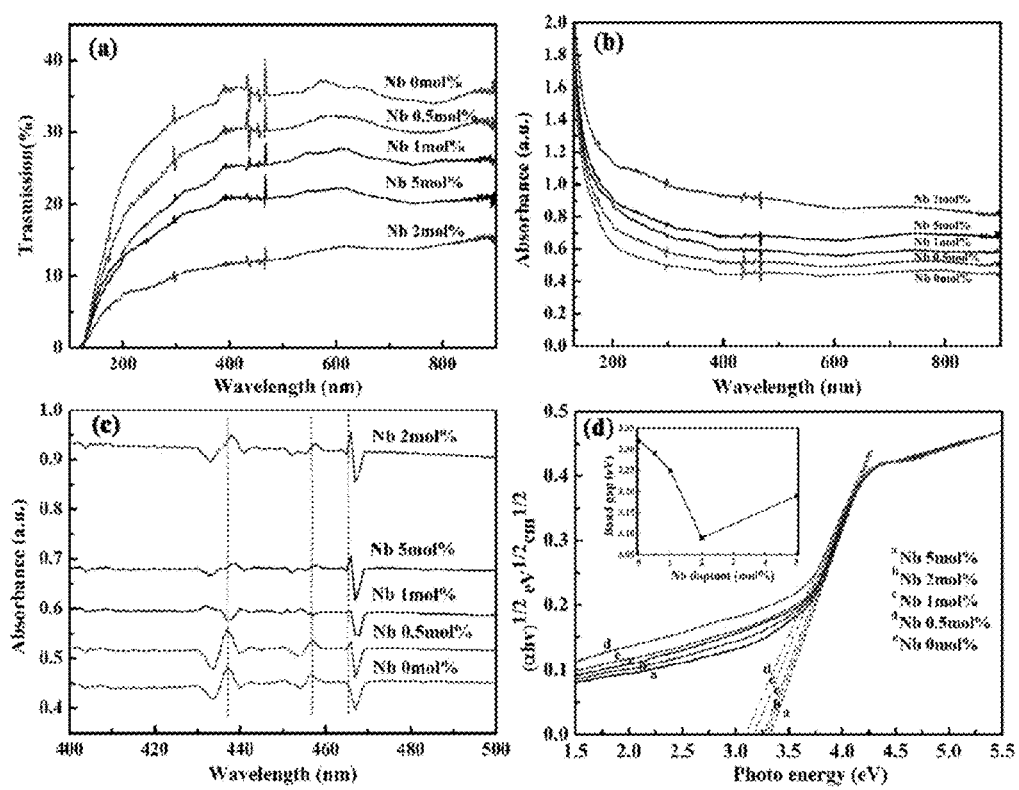
FIG. 7 shows the UV-vis transmission (a) and absorbance (b) spectra of DSSCs based on the Nb-doped $TiO_2$ NPs electrodes with different Nb contents. (c) is the magnified absorbance spectra in the wavelength range of 400~500 nm. (d) is the $(\alpha h\nu)^{1/2}$ versus hν plots for the Nb-doped $TiO_2$ electrodes. The inset in (d) shows the variation of optical band gap with the increase of Nb dopant content.
Figure 8:
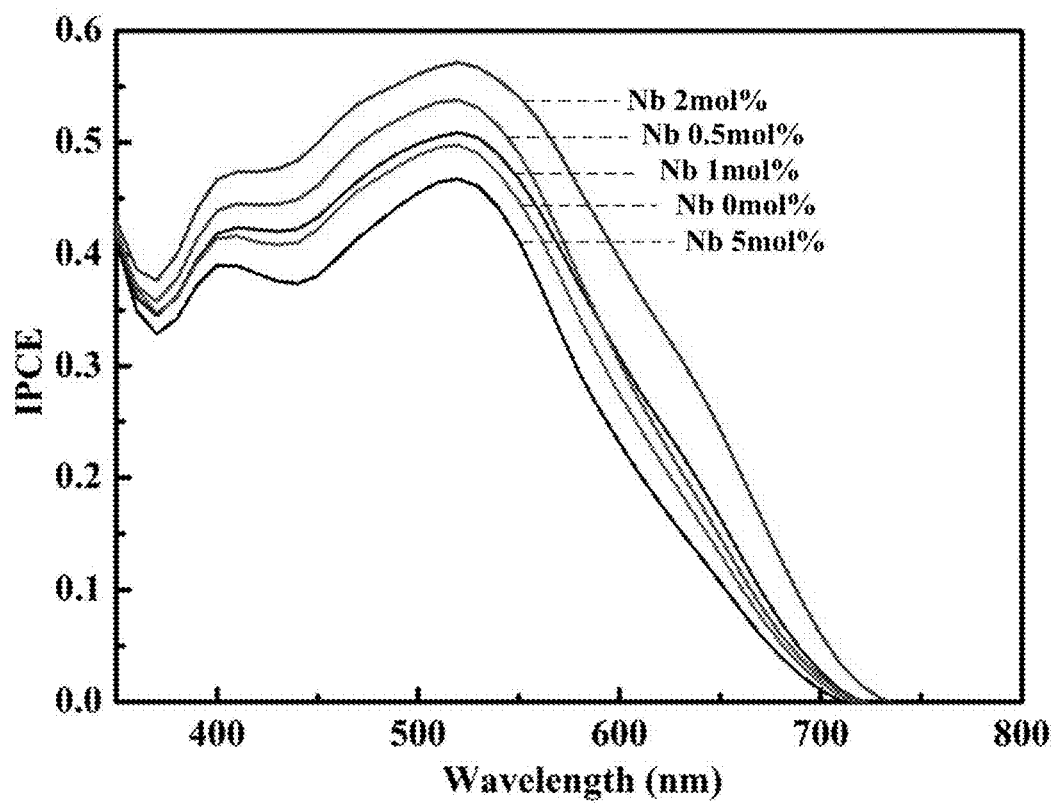
FIG. 8 shows the incident photon-to-current conversion efficiency (IPCE) spectra of DSSCs based on the undoped and Nb-doped $TiO_2$ NPs electrodes.

FIG. 8 shows incident photon-to-current conversion efficiency (IPCE) spectra of the undoped and Nb-doped $TiO_2$ NPs as the photoanode applied in DSSCs, which is defined as the number of electrons generated by light in the external circuit divided by the number of incident photons. Apparently, the IPCE at all wavelengths displays an important enhancement with increasing the Nb dopant from 0.5~2 mol % as compared to the undoped $TiO_2$. Moreover, an enhanced IPCE spectra at longer wavelengths in visible region is observed, which mainly results from the expanded visible light absorption due to Nb doping (FIG. 7). The IPCE is determined by the amount of dye loading influencing light-harvesting, the charge collection efficiency and charge-injection efficiency.[34] For this case, the intrinsic improvement of IPCE can be mainly attributed to the enhanced electron-injection due to the decreased band-gap and the improved electron-transfer ability caused by the increased conductivity verified previously when Nb was doped into $TiO_2$.[26] Moreover, from XRD and surface analysis, the film density and crystallinity increase with increasing Nb content from 0.5~2.0 mol %, which prefers to produce higher specific surface areas.[36] It may result in a higher dye molecule loading and also provides a slight increase in the ability to convert more photons to electrons. However, the IPCE exhibits an obvious decrease when the Nb content is increased to 5 mol %, which is primarily caused by the poor quality of Nb-doped film. It is found that the composite slurry viscosity is very low when the Nb dopant content is increased to 5 mol % by increasing the gel weight, which makes it difficult to print on previous undoped $TiO_2$ film layer. As a result, a poor Nb-doped film layer with inhomogeneous $TiO_2$ distribution and thickness is formed, consequently, leading to less dye molecule loading and low IPCE. It further indicates the Nb-doped NPs film layer plays an important role in the photon-to-current conversion process for the highly efficient DSSCs.

EXAMPLE 6

Photovoltaic Performance of DSSCs

Figure 9:
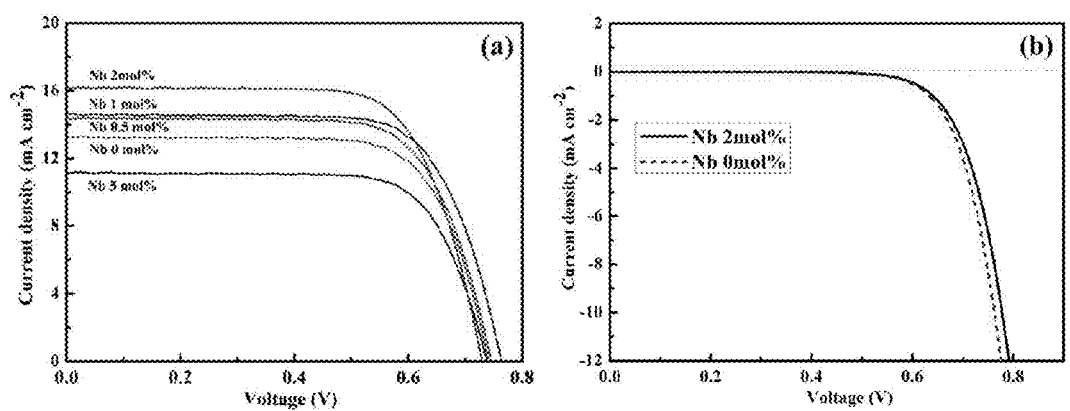
FIG. 9 shows the photocurrent density-photovoltage (J-V) curves (a) and dark current-voltage curves (b) for DSSCs based on the undoped and Nb-doped $TiO_2$ NPs electrodes with different Nb contents.

FIG. 9a shows the photovoltaic performance of DSSCs based on the undoped and Nb-doped $TiO_2$ NPs electrodes with different Nb contents under one sun illumination (AM 1.5 G, 100 mW/cm$^2$). The obtained photovoltaic parameters are listed in Table 3. It can be seen that the photovoltaic performance of DSSCs based on Nb-doped $TiO_2$ NPs exhibits a pronounced increase with increasing the Nb contents from 0.5 to 2.0 mol % as compared to the DSSCs based on the undoped $TiO_2$ NPs. The DSCCs based on the 2.0 mol % Nb-doped NPs present the maximum short-circuit photocurrent density ($J_{SC}$) of 16.17 mA cm$^{-2}$ and the highest energy conversion efficiency (η) of 8.44% with an open circuit voltage ($V_{oc}$) of 0.73 V and a fill factor (FF) of 0.71. In comparison with the undoped $TiO_2$, the $J_{sc}$ and η of the 2.0 mol % Nb-doped $TiO_2$ DSSCs are increased by 22.7% and 18.9%, respectively, which are superior to previous results of DSSCs based on Nb-doped $TiO_2$ NPs synthesized by hydrothermal method.[22,26] It further indicates that the DSSCs based on the presently claimed one-pot synthesized Nb-doped $TiO_2$ NPs are not only superior in the low-cost but also in the photovoltaic performance. In the DSSCs prepared by the presently claimed method, the $J_{sc}$ is dependent on the electron-injection, charge-transfer, and charge-recombination processes.[1] FIG. 7 indicates that the Nb doping leads to an enhanced light-harvesting from visible range and a decreased band-gap. For the n-type semiconductor of Nb-doped $TiO_2$, the decrease of band gap means that a positive shift of the CB. As a result, the driving force of electron injection, namely the difference between the dye lowest unoccupied molecular orbital (LUMO) level and the CB of $TiO_2$ is increased, consequently, leading to an important improvement of the $J_{sc}$. On the other hand, the XPS and UV-vis verifies that the $Nb^{5+}$ doping can also induce some intraband states such as the Nb 4d level, which can enhance the overall mobility and transportation of the excited electrons.[22] Additionally, the Nb element has higher conductivity (6.93×10$^4$/(cm·U)) than Ti (2.34×10$^4$/(cm·U)), and the tightly bound Nb to $TiO_2$ NPs assists to promote more rapid electron transfer from CB of $TiO_2$ to the conductive substrate, effectively suppressing the recombination of injected elections with the $I^{3-}$ ions. Therefore, the $J_{sc}$ is largely improved. Furthermore, it can be seen that the $V_{oc}$ is also slightly improved after Nb doping (Table 3). The $V_{oc}$ is determined by the energy difference between the quasi-Fermi level ($E_F$) of the illuminated semiconductor electrode and the potential of the redox couple in the electrolyte.[1] Considering $TiO_2$ as a n-type semiconductor, the incorporation of Nb is a donor doping, which would promote the $E_F$ to shift toward the $TiO_2$ CB, consequently, leading to an increase of $V_{oc}$. Therefore, the introduction of Nb doping not only increases the photocurrent via expanded light absorption and enhanced electron-injection, but also improves the photovoltage by n-type doping effect. This double-function is very significant for enhancing the photovoltaic performance of the DSSCs.

TABLE 3

Performance characteristics of DSSCs based on the undoped and Nb-doped $TiO_2$ NPs electrodes:

| DSSCs | $J_{sc}$ (mA cm$^{-2}$) | $V_{oc}$ (V) | FF | η (%) |
|---|---|---|---|---|
| Nb 0 mol % | 13.29 | 0.72 | 0.74 | 7.10 |
| Nb 0.5 mol % | 14.34 | 0.75 | 0.72 | 7.66 |
| Nb 1.0 mol % | 14.61 | 0.76 | 0.72 | 8.01 |
| Nb 2.0 mol % | 16.17 | 0.73 | 0.71 | 8.44 |
| Nb 5.0 mol % | 11.13 | 0.73 | 0.73 | 6.05 |

FIG. 9b shows the photocurrent density-voltage (J-V) curves from 0 V to 0.8V in the dark. In DSSCs, a higher dark current density means more serious recombination reaction happening at the interface between $TiO_2$ NPs photoanode and electrolyte. As seen, the dark current of the DSSCs based on the 2.0 mol % Nb-doped $TiO_2$ NPs presents an obvious decrease and the onset voltage (see the arrows) displays a positive shift toward about 0.1 V than that of the undoped one. The increase of the onset voltage and the reduction of the dark current further demonstrate that the suitable Nb-doping into $TiO_2$ NPs successfully reduces the recombination of $I^{3-}$.

Figure 10:
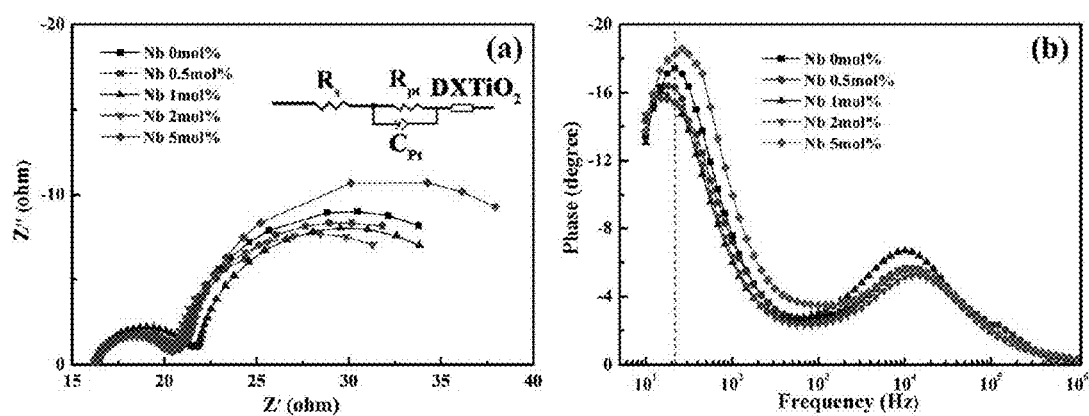
FIG. 10 shows the Nyquist plots (a) and Bode plots (b) of the EIS for DSSCs based on the Nb-doped $TiO_2$ NPs electrodes with different Nb contents. The inset in (a) is the equivalent circuit.

To further confirm the effect of Nb doping in transporting the electrons and restraining the recombination in the nanostructure, the EIS, a powerful tool to clarify the electronic and ionic transport processes, was measured under the illumination of one sun at open-circuit potential conditions. FIG. 10a shows the Nyquist plots obtained from the DSSCs based on Nb-doped $TiO_2$ NPs and undoped ones at frequencies ranging from 1 MHz to 0.1 Hz. The equivalent circuit is depicted in the inset of FIG. 10a. The response of the impedance Z(W) for the photoanode can be expressed as the following equation:[37]

$$Z(w) = \left(\frac{R_t R_k}{1 + iw/w_k}\right)^{1/2} \coth\left(\left(\frac{w_k + iw}{w_d}\right)^{1/2}\right) \quad (2)$$

where $R_t$, $R_k$, $W_k$, and $W_d$ represent the electron transport resistance in $TiO_2$, the charge-recombination resistance, the rate constant for recombination, and the characteristic angular frequency for electron diffusion in a finite layer, respectively. The detailed electrical parameters obtained are summarized in Table 4:

TABLE 4

The electrochemical impedance parameters of DSSCs based on the undoped and Nb-doped $TiO_2$ NPs electrodes:

| DSSCs | $R_s$ (Ù) | $C_{pt}$ (F) | $R_{pt}$ (Ù) | $W_k$ (s$^{-1}$) | $W_d$ (s$^{-1}$) | $R_t$ (Ù) | $R_k$ (Ù) |
|---|---|---|---|---|---|---|---|
| Nb 0 mol % | 16.3 | 1.10E−05 | 3.81 | 97.42 | 545.9 | 3.21 | 17.96 |
| Nb 0.5 mol % | 16.3 | 1.10E−05 | 3.92 | 91.17 | 568.5 | 2.66 | 16.57 |
| Nb 1.0 mol % | 16.3 | 1.10E−05 | 4.76 | 89.62 | 575.1 | 2.49 | 15.94 |
| Nb 2.0 mol % | 16.3 | 1.10E−05 | 3.57 | 94.30 | 607.7 | 2.37 | 15.29 |
| Nb 5.0 mol % | 16.3 | 1.10E−05 | 3.61 | 111.3 | 534.6 | 4.56 | 21.73 | where $R_s$, $C_{pt}$, and $R_{pt}$ represent the series resistance, the capacitance at the Pt surface and the resistance at the Pt surface, respectively. In FIG. 10a, the biggest semicircles in the medium frequency (1~100 Hz) correspond to the photoinjected electron transport and recombination competition at the $TiO_2$/dye/electrolyte interface. As shown, the semicircles at the intermediate frequency regions are decreased with increasing Nb dopant content from 0 to 2 mol %, which implies that the photogenerated electrons transfer faster in the working electrode interface. It is consistent with the increased $W_d$ values in Table 3 and $J_{sc}$ in FIG. 9. The $W_d$ is inversely proportional to electron transportation time (t) and $W_k$ is inversely proportional to electron lifetime (τ).[38] Larger $W_d$ value means faster electron transportation rate within $TiO_2$ films and larger Jsc, and smaller $W_k$ means longer electron lifetime and larger $V_{oc}$ (Table 4). The low $W_k$ in 5 mol % Nb is also in accordance with its low Jsc data. These results are also supported by the Bode plots (FIG. 10b). It has been verified that the value of electron recombination rate, $k_{eff}$ (s$^{-1}$), is equal to value of the maximum peak frequency ($\omega_{max}$) in the middle frequency region.[38] As shown, the medium frequency peaks are gradually shifted to lower frequency with increasing Nb content from 0 to 2 mol %, which of decrease in $\omega_{max}$ confirms that a slower electron recombination process in the Nb-doped DSSCs. Furthermore, as mentioned before, the dark J-V curves of Nb-doped cells (FIG. 9b) also show a lower dark current than that for undoped one; this is in agreement with the fewer back reactions and slower recombination for Nb-doped based cells. All these results sufficiently indicate that the suitable incorporation of Nb into the $TiO_2$ NPs can prominently increase the electron transport rate and effectively suppress the charge recombination process in DSSCs, and consequently, leading to an important improvement in the photoelectric conversion efficiency.

Uniform $Nb^{5+}$-doped anatase $TiO_2$ nanoparticles with different doping contents from 0.5 to 5.0 mol % for use in highly efficient DSSCs are successfully prepared by rapid one-pot synthesis through directly mixing commercial $TiO_2$ slurry with a functionalized $Nb_2O_5$ gel following by heat treatment. The $Nb_2O_5$ gel, obtained by UV treatment of a mixture of $NbCl_5$ powder, ethanol and water with a certain ratio, is confirmed to contain amorphous $Nb_2O_5$ and O—H functional group by Raman spectra. The XRD, Raman and XPS reveals that Nb can be well doped into the $TiO_2$ lattice and $Ti^{4+}$ is substituted by $Nb^{5+}$ to preferentially generate free carriers using this cost-effective method. The red-shift of the UV-vis absorbance peak and improved IPCE demonstrate that the $Nb^{5+}$ ion doping significantly broadens the spectral absorption of $TiO_2$ into visible light region and effectively enhances light-harvesting. The band gap is narrowed with increasing the Nb dopants. The best cell efficiency of 8.44% for DSSCs is obtained based on 2.0 mol % Nb-doped $TiO_2$, which is improved by 18.9% compared to the undoped $TiO_2$ DSSC. The improvement of energy conversion efficiency is mainly ascribed to the extended light absorption, faster electron injection and decreased recombination of electron-hole pair by introducing $Nb^{5+}$ doping. This method offers a facile and potential mass-production way to synthesize low-cost n-type metallic ion doped $TiO_2$ nanoparticles for energy or environmental applications.

While embodiments of the present invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

REFERENCES CITED

The disclosure of the following cited references is also incorporated herein by reference in its entirety:
1) S. F. Zhang, X. D. Yang, Y. H. Numata, L. Y. Han, *Energy Environ. Sci.* 2013, 6, 1443-1464.
2) H. Jeong, Y. Pak, Y. Hwang, H. Song, K. H. Lee, H. C. Ko, G. Y. Jung, *Small* 2012, 8, 3757-3761.
3) B. O'Regan, M. Grätzel, *Nature* 1991, 353, 737-740.
4) F. Sauvage, J. D. Decoppet, M. Zhang, S. M. Zakeeruddin, P. Comte, M. Nazeeruddin, P. Wang, M. Grätzel, *J. Am. Chem. Soc.* 2011, 133, 9304-9310.
5) A. Yella, H. W. Lee, H. N. Tsao, C. Yi, A. K. Chandiran, M. K. Nazeeruddin, E. W. G. Diau, C. Y. Yeh, S. M. Zakeeruddin, M. Grätzel, *Science* 2011, 334, 629-634.
6) J. An, W. Guo, T. L. Ma, *Small* 2012, 22, 3427-3431.
7) L. Y. Han, A. Islam, H. Chen, C. Malapaka, B. Chiranjeevi, S. Zhang, X. Yang, M. Yanagida, *Energy Environ. Sci.* 2012, 5, 6057-6060.
8) H. C. Weerasinghe, F. Z. Huang, Y. B. Cheng, *Nano Energy* 2013, 2, 174-189.
9) H. J. Su, J. Zhang, L. Liu, H. Z. Fu, *Trans. Nonferrous Met. Soc. China* 2012, 22, 2548-2553.
10) J. He, H. Lindström, A. Hagfeldt, S. E. Lindquist, *Sol. Energy Mater. Sol. Cells* 2000, 62, 265-273.
11) H. N. Kim, J. K. Moon, *ACS App. Mater. Interfaces* 2012, 4, 5821-5825.
12) Q. P. Liu, Y. Zhou, Y. D. Duan, M. Wang, Y. Lin, *Electrochim. Acta* 2013, 95, 48-53.
13) Y. T. Shi, K. Wang, Y. D, H. Zhang, J. F. Gu, C. Zhu, L. Wang, W. Guo, A. Hagfeldt, N. Wang, T. L. Ma, *Adv. Mater* 2013, 25, 4413-4419.
14) I. S. Cho, C. H. Lee, Y. Z. Feng, M. Logar, P. M. Rao, L. L. Cai, D. R. Kim, R. Sinclair, X. L. Zheng, *Nature Communi.* 2013, 4, 1723.
15) X. B. Chen, S. S. Mao, *Chem. Rev.* 2007, 107, 2891-2959.
16) X. Y. Wu, S. Yin, Q. Dong, C. S. Guo, T. Kimura, J. Matsushita, T. Sato, *J. Phys. Chem. C* 2013, 117, 8345-8352.
17) K. Y. Cai, Y. H. Hou, Y. Hu, L. Zhao, Z. Luo, Y. S. Shi, M. Lai, W. H. Yang, P. Liu, *Small* 2011, 21, 3026-3031.
18) W. Q. Luo, C. Y. Fu, R. F. Li, Y. S. Liu, H. M. Zhu, X. Y. Chen, *Small* 2011, 21, 3046-3056.
19) W. Zeng, T. M. Liu, Z. C. Wang, *Sensors Actuat. B* 2012, 166-167, 141-149.
20) L. D. Trizio, R. Buonsanti, A. M. Schimpf, A. Llordes, D. R. Gamelin, R. Simonutti, D. J. Milliron, *Chem. Mater* 2013, 25, 3383-3390.
21) S. Singh, H. Kaur, V. N. Singh, K. Jain, T. D. Senguttuvan, *Sensors Actuat. B* 2012, 171-172, 899-906.
22) T. Nikolay, L. Larina, O. Shevaleevskiy, B. T. Ahn, *Energy Environ. Sci.* 2011, 4, 1480-1486.
23) J. Yu, Y. L. Yang, R. Q. Fan, H. J. Zhang, L. Li, L. G. Wei, Y. Shi, K. Pan, H. G. Fu, *J. Power Sources* 2013, 243, 436-443.
24) A. E. Shalan, M. M. Rashad, *Appl. Surf. Sci.* 2013, 283, 975-981.
25) Y. D. Duan, N. Q. Fu, Q. Zhang, Y. Y. Fang, X. W. Zhou, Y. Lin, *Electrochim. Acta* 2013, 107, 473-480.
26) X. J. Lü, X. L. Mou, J. J. Wu, D. W. Zhang, L. L. Zhang, F. Q. Huang, F. F. Xu, S. M. Huang, *Adv. Funct. Mater.* 2010, 20, 509-515.
27) S. G. Kim, M. J. Ju, I. T. Choi, W. S. Choi, H. J. Choi, J. B. Baek, H. K. Kim, *RSC Adv.* 2013, 3, 16380-16386.
28) H. P. Feng, T. C. Paudel, B. Yu, S. Chen, Z. F. Ren, G. Chen, *Adv. Mater* 2011, 23, 2454-2459.
29) Y. S. Chen, I. E. Wachs, *J. Catal.* 2003, 217, 468-477.
30) X. L. Wang, W. X. Hu, I. M. Chou, *J. Geochem. Explor.* 2013, 132, 111-119.
31) J. H. Jang, T. Y. Kim, N. J. Kim, C. H. Lee, E. M. Park, C. Park, S. J. Suh, *Mater. Sci. Eng. B,* 2011, 176, 1505-1508.
32) M. Z. Atashbar, H. T. Sunb, B. Gong, W. Wlodarski, R. Lamb, *Thin Solid Films* 1998 326, 238-244.
33) T. L. Thompson, J. T. Yates, *Chem. Rev.* 2006, 106, 4428-4453.
34) S. S. Shin, J. S. Kim, J. K. Suk, K. D. Lee, D. W. Kim, J. H. Park, I. S. Cho, K. S. Hong, J. Y. Kim, *ACS Nano* 2013, 7, 1027-1035.
35) J. Yang, X. T. Zhang, C. H. Wang, P. P. Sun, L. L. Wang, B. Xia, Y. C. Liu, *Solid State Sci.* 2012, 14, 139-144.
36) G. Cheng, M. S. Akhtar, O. B. Yang, F. J. Stadler, *ACS Appl. Mater. Interfaces,* 2013, 5, 6635-6642.
37) Y. T. Shi, C. Zhu, L. Wang, C. Y. Zhao, W. Li, K. K. Fung, T. L. Ma, A. Hagfeldt, N. Wang, *Chem. Mater* 2013, 25, 1000-1012.
38) M. Adachi, M. Sakamoto, J. Jiu, Y. Ogata, S. Isoda, *J. Phys. Chem. B* 2006, 110, 13872-13880.
39) H. K. Fujishima Akira, *Nature* 1972, 238.
40) H. Kato, M. Hori, R. Konta, Y. Shimodaira, A. Kudo, *Chemistry Letters* 2004, 33, 1348-1349.
41) A. Kudo, Y. Miseki, Chemical Society Review 2009, 38, 253-278.

What is claimed is:
1. A method of preparing a $Nb_2O_5$-doped $TiO_2$ nanoparticles-containing solution comprising:
(a) preparing a transparent precursor solution containing niobium chloride ($NbCl_5$);
(b) treating the transparent precursor solution with UV;
(c) centrifuging the UV-treated transparent precursor solution and removing the residual water to obtain a polymeric gel containing niobium (Nb) as the dopant source;
(d) adding a $TiO_2$ slurry into the polymeric gel containing corresponding amount of niobium compound followed by a high-speed mixing and defoaming to obtain different homogenously mixed $TiO_2$—Nb composite slurries in different molar ratio of Nb/(Nb+$TiO_2$) ranging from 0.5~5.0 mol %; and
(e) heat treating the homogenously mixed $TiO_2$—Nb composite slurries for a period of time in order to obtain the $Nb_2O_5$-doped $TiO_2$ nanoparticles-containing solution.
2. The method of claim 1, wherein said preparing in (a) comprises dissolving $NbCl_5$ powder into ethanol and adding deionized water followed by stirring until the transparent precursor solution is formed.

3. The method of claim 2, wherein said NbCl$_5$ powder is 0.027% w/v in said ethanol and deionized water, and wherein said ethanol to said deionized water is in a volume ratio of 1:1.

4. The method of claim 1, wherein said UV treatment in (b) is for about 20 minutes.

5. The method of claim 1, wherein said centrifuging in (c) is at 4,000 rpm for 10 minutes.

6. The method of claim 1, wherein the TiO$_2$ slurry in (d) is about 2 g and said corresponding amount of niobium compound is about 92 to 964 mg per about 2 g of said TiO$_2$ slurry.

7. The method of claim 1, wherein the high-speed mixing in (d) is carried out at 2200 rpm for 2 minutes and the defoaming is carried out at 2000 rpm for 2 minutes by using a conditioner mixer.

8. The method of claim 1, wherein said homogenously mixed TiO$_2$—Nb composite slurries in (e) is heat treated at about 500° C. for 30 minutes.

* * * * *